US008798287B2

(12) United States Patent
Lipp

(10) Patent No.: US 8,798,287 B2
(45) Date of Patent: Aug. 5, 2014

(54) VEHICLE SOUND SIMULATION SYSTEM

(76) Inventor: Robert Lipp, Tacoma, WA (US)

(*) Notice: Subject to any disclaimer, the term of this patent is extended or adjusted under 35 U.S.C. 154(b) by 405 days.

(21) Appl. No.: 12/706,657

(22) Filed: Feb. 16, 2010

(65) Prior Publication Data

US 2010/0208915 A1 Aug. 19, 2010

Related U.S. Application Data

(60) Provisional application No. 61/153,125, filed on Feb. 17, 2009.

(51) Int. Cl.
*H04B 1/00* (2006.01)
*H04R 5/02* (2006.01)

(52) U.S. Cl.
CPC .......... *H04R 5/02* (2013.01)
USPC .......... 381/86

(58) Field of Classification Search
CPC ... H04R 2499/13; H04R 5/02; B60R 11/0217
USPC .......... 381/150, 152, 86–89, 98, 104, 107; 434/69, 66, 236, 258, 62, 307 R
See application file for complete search history.

(56) References Cited

U.S. PATENT DOCUMENTS 5,366,376 A * 11/1994 Copperman et al. .......... 434/69
5,618,178 A * 4/1997 Copperman et al. .......... 434/62
8,065,026 B2 * 11/2011 Beckert et al. .......... 700/94
2009/0011389 A1 * 1/2009 Sizov .......... 434/66
2009/0066499 A1 3/2009 Bai et al.

FOREIGN PATENT DOCUMENTS

JP 2005-134885 * 5/2005 .......... G10K 15/04
WO WO 2008/090337 * 7/2008 .......... G10K 15/02

* cited by examiner

*Primary Examiner* — Lun-See Lao
(74) *Attorney, Agent, or Firm* — Knobbe Martens Olson & Bear, LLP

(57) ABSTRACT

A vehicle sound simulation system and sound simulation methodologies are provided. The vehicle sound simulation system includes a sound playback device utilized to produce sound signals. As a vehicle is operated, the vehicle sound simulation system approximates an engine state and generates sounds corresponding to the engine state. The vehicle sound simulation system generates sounds in accordance with a vehicle sound generation routine that utilizes a number of inputted parameters to vary the sounds generated through the sound playback device.

18 Claims, 3 Drawing Sheets

VEHICLE SOUND SIMULATION SYSTEM

CROSS-REFERENCE TO RELATED APPLICATIONS

This application claims the benefit of U.S. Provisional Patent Application No. 61/153,125, entitled REALISTIC MOTOR VEHICLE ENGINE SOUND SIMULATION SYSTEM, and filed on Feb. 17, 2009, the entirety of which is incorporated herein by reference.

BACKGROUND

Vehicle sound simulation systems can generate sounds that correspond to an estimation of the current state or performance of a combustion engine. Typical vehicle sound simulation systems can approximate the current state or performance of a combustion engine by monitoring various aspects of the combustion engine during operation. In this regard, a typical vehicle sound simulation system may have one or more electrical sensors that are specifically designed to measure one or more combustion engine operation parameters. Examples of such combustion engine operation parameters include manifold pressure, exhaust pressure, or engine tachometer readings. As the development of alternative vehicle propulsion systems or power plants increases, traditional combustion engine operation parameters may no longer serve as viable means to approximate the current state or performance of the propulsion system or power plant. For example, manifold pressure sensors may not be able to approximate the current state or performance of an electric engine or hybrid electric engine.

Most vehicle sound simulation systems attempt to closely coordinate the generated sounds in accordance with the matched state of the engine. For example, in a traditional vehicle sound simulation system, if the driver presses against the throttle pedal, the combustion engine is assumed to be in an accelerating state and a corresponding sound should be generated contemporaneously. Likewise, in a traditional vehicle sound simulation system, if the driver releases the throttle pedal, the combustion engine is assumed to be in a decelerating state and corresponding sounds should be generated contemporaneously. As previously described, however, because vehicle sound simulation system systems are typically coupled to a motor vehicle's tachometer, or other electrical sensors, time delays created between the determination of state of the engine from the tachometer (or other sensor) and the generated simulated sound from the vehicle sound simulation system can be present. The frequency and length of such delays can impact the effectiveness of the vehicle sound simulation system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present application relates to a vehicle sound simulation system and sound simulation methodologies. The vehicle sound simulation system includes a sound playback device utilized to produce sound signals capable of driving speakers and sound signals compatible with the auxiliary input interface of vehicle entertainment systems. The sound playback device may be an external device mounted within the interior or exterior of a vehicle. Alternatively, the sound playback device may correspond to multi-use sound playback devices, such as a vehicle horn, radio, paging system, entertainment system, etc. As a vehicle is operated, the vehicle sound simulation system approximates an engine state and generates sounds corresponding to the engine state. In one example, the generated sounds may be approximated to closely tie to the particular performance of the vehicle. In another example, the generated sounds may be approximated to exaggerate the particular performance of the vehicle (e.g., "muscle car" combustion engine sounds for a vehicle having an electric motor). In an illustrative embodiment, the vehicle sound simulation system can generate sounds in accordance with a vehicle sound generation routine that utilizes a number of inputted parameters to vary the sounds generated through the sound playback device.

Figure 1:
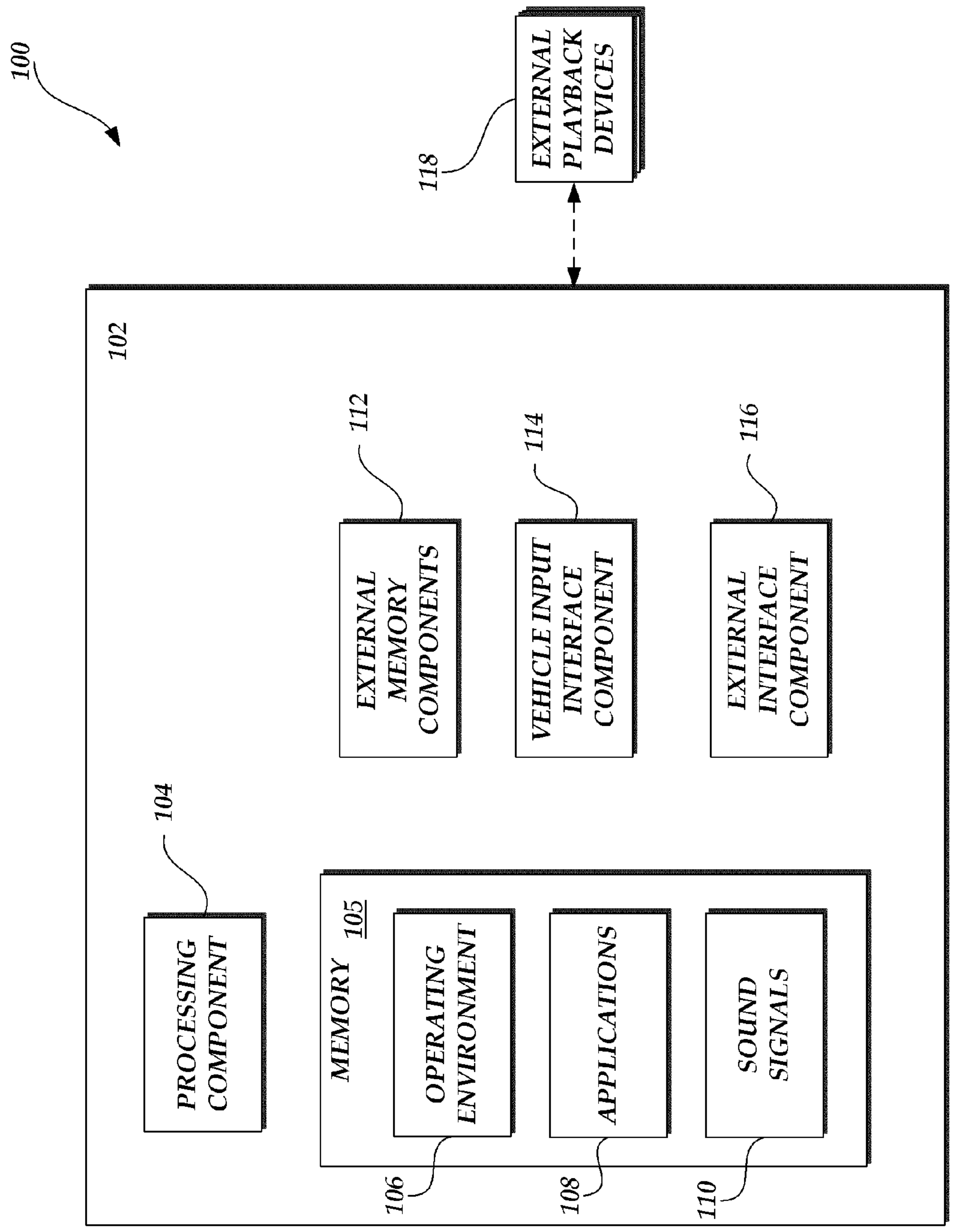
FIG. 1 is a block diagram illustrative of a vehicle sound simulation system.

FIG. 1 is a block diagram illustrative of a vehicle sound simulation environment 100. In an illustrative embodiment, the vehicle sound simulation environment 100 can include a vehicle sound simulation system 102 for use in obtaining vehicle state information from a target vehicle and generating one or more sounds corresponding to the vehicle state information. The vehicle sound simulation system 102 may include one or more processing components 104, such as one or more CPUs. The vehicle sound simulation system 102 may also include system memory 105, which may correspond to any combination of volatile and/or non-volatile storage mechanisms. The system memory 105 may store information which provides an operating system component 106, various application components 108, program data, illustratively sound signals 110 utilized by the vehicle sound simulation system 102 to generate sounds. The above-enumerated list of components is representative and is not exhaustive of the types of functions performed, or components implemented, by the vehicle sound simulation system 102. For example, the system memory 105 may include additional application components 108 or may omit system stored program data in the sound signals 110. Additionally, one skilled in the relevant art will appreciate that additional or alternative components may also be included in the vehicle sound simulation system 102 to carry out other intended functions. Illustratively, the vehicle sound simulation system 102 may include a physical housing and associated hardware that facilitates an external mounting within a vehicle (e.g., underneath a dashboard). Alternatively, the vehicle sound simulation system 102 may include a housing and associated hardware that facilitates incorporation of the vehicle sound simulation system 102 within a vehicle (e.g., within an engine compartment of the vehicle).

With continued reference to FIG. 1, the vehicle sound simulation system 102 may also include number of additional components, systems and/or subsystems for facilitating communications with a target vehicle or one or more external devices. The additional components can include external memory components 112 for storing program data, application programs, vehicle state information and sound signals utilized in the operation of the vehicle sound simulation system 102. Illustratively, the external memory components 112 can correspond to removable storage media that be accessed by the vehicle sound simulation system 102, such as flash-based memory. Although the external memory components 112 are illustrated as being physically part of the vehicle sound simulation system 102, in an alternative embodiment, the vehicle sound simulation system 102 may access information from remote, external memory components 112 via a wired or wireless communication. By way of example, the wireless communication methodologies can be achieved in accordance with a cellular radio access network, an IP-based wireless communications network based on the family of IEEE 802.11 technical standards ("WiFi") or IEEE 802.16 standards ("WiMax"), a converged wireless communications network such as Unlicensed Mobile Access (UMA), a General Access Network (GAN), the Bluetooth protocols and other wired and wireless networks or communication protocols. The operation of wireless communications networks, such as wireless communications network 114 are well known and will not be described in greater detail.

The additional components of the vehicle sound simulation system 102 can also include one or more vehicle input interface components 114 for obtaining vehicle state information provided by the vehicle or other system. Illustratively, the vehicle input interface component 114 can include an interface compatible with one or more On-Board Diagnostics ("OBD") standard interfaces that provide access to the vehicle's process control network, such OBD-1, OBD-1.5, OBD-II, EOBD, EOBD2, JOBD and the like. An alternative embodiment could involve accessing the vehicle's process control network by connecting to the vehicle's electronics control unit (ECU) instead of using the OBD interface. One skilled in the relevant art will appreciate that the external vehicle interface component 114 compatible with one or more standard interfaces may include specific software modules for querying and processing information in accordance with signaling protocols including, but not limited to, the SAE J1850 PWM, the SAE J1850 VPW, the ISO 9141-2, the ISO 14230 KWP2000, the ISO 15765 CAN signaling protocols, and the like. Additionally, such an external vehicle interface component 114 may also include specific hardware components for facilitating a physical connection to a communication port, either directly or via a wired connection.

Still further, the additional components of the vehicle sound simulation system 102 can include one or more external interface components 116. In one aspect, the external interface components 116 can correspond to components utilized to obtain inputs from one or more users. Examples include touch pads or touch input components, specialized keys/buttons, displays with "soft" buttons, voice or audible input components and the like. In another aspect, the external interface components 116 can correspond to component utilized to generate outputs to one or more individuals or other components. Examples include audio components utilized to generate audible sounds, visual displays or indicators, and interfaces for transmitting video or audio signal to external devices, such as external sound playback devices 118 (e.g., media players, navigation systems, radios, or external speaker systems). In an illustrative embodiment, a vehicle sound simulation system 102 may include multiple external interface components for interacting with a vehicle driver and for generating sounds internally within a vehicle as well as for generating sounds externally (e.g. to a pedestrian). The external interface components 116 can include various software and hardware components, including software application, co-decs, amplifiers, physical interfaces utilized in conjunction with the generation of the appropriate audio or video signals and the transmission of the signals to one or more target components.

Illustratively, a system manufacturer or distributor can record one or more engine sounds for utilization by the vehicle sound simulation system 102. In one embodiment, the vehicle sound simulation system 102 can process vehicle state information in accordance with the software applications and sound signals provided by such a system manufacturer or distributor. In another aspect, the software applications and sound signals utilized by the vehicle sound simulation system 102 may be customized, or otherwise modified, by one or more users. For example, a user can select preferred sounds to be generated in accordance with determined vehicle state or modify the information utilized to determine vehicle state. Customization or modification may be made by manipulating input devices associated with the vehicle sound simulation system 102 or via an external device, such as a personal computing device.

Figure 2:
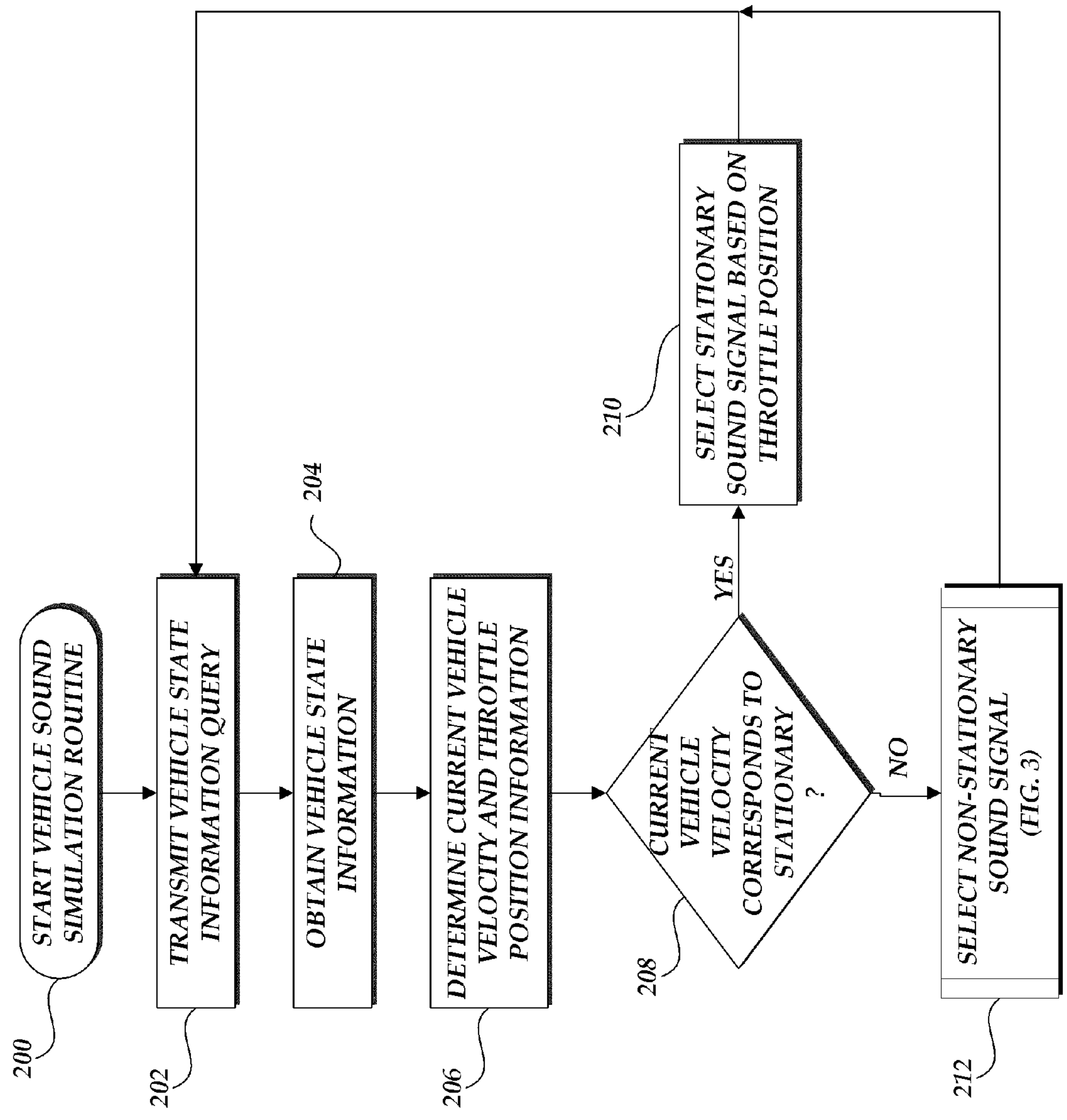
FIG. 2 is a flow diagram illustrative of a vehicle sound simulation processing routine implemented by a vehicle sound simulation system.

Turning now to FIG. 2, a flow diagram illustrative of a vehicle sound simulation routine 200 implemented by the vehicle sound simulation system 102 to generate sounds based on vehicle state will be described. At block 202, the vehicle sound simulation system 102 transmits a vehicle state information query. Illustratively, the vehicle state information query corresponds to the collection of information via a vehicle input interface component 114, such as an OBD-II port. The query can include causing the vehicle input interface component 114 to generate a transmission of a request to another computing device or an instruction to the vehicle input interface component 114 to obtain information being continuously transmitted. At block 204, the vehicle sound simulation system 102 obtains vehicle state information.

At block 206, the vehicle sound simulation system 102 determines current vehicle velocity and throttle position information.

At decision block 208, the vehicle sound simulation system 102 determines whether the current vehicle location corresponds to a stationary state. In an illustrative embodiment, the vehicle sound simulation system 102 distinguishes sounds to be generated when the vehicle is stationary (or substantially stationary) from sounds to be generated while the vehicle is non-stationary. For example, the vehicle sound simulation system 102 may generate sounds indicative of a revving car engine at rest only when the vehicle is determined to be in a stationary state. Illustratively, the determination of vehicle stationary state can correspond to a comparison of the vehicle velocity information and application of a threshold or range of velocities that can be considered to correspond to a stationary vehicle state. As previously described, the range of velocities or thresholds may be customizable by the vehicle sound simulation system 102 manufacturer, distributors or users.

If the vehicle velocity is determined to correspond to a stationary vehicle state, at block 210, the vehicle sound simulation system 102 selects a stationary sound based on throttle position. In an illustrative embodiment, the sound signals 110 or external memory components 112 maintain a set of digitally encoded sound signals that can be generated in accordance with a stationary vehicle state. The selection of specific sound signals can correspond to a data table indexed according to throttle position. For example, sound signals indicative of the sounds of an engine at low rate of revolution would be indexed to correspond to one or more lower throttle positions. Additionally, the volume setting associated with selected sound signals may also be dependent on a combination of the throttle position and a brief one or two second history of previous throttle position settings. Using the previous settings can indicate if the driver is gradually increasing the accelerator or if the accelerator is increasing rapidly. As previously described, the sound signals utilized by the vehicle sound simulation system 102 may be configured to match, or attempt to match, the performance/sounds of a comparable vehicle (e.g., a subcompact electric vehicle matched with a subcompact combustion engine vehicle). Alternatively, the vehicle sound simulation system 102 may be configured to exaggerate the matching performance/sounds (e.g., a subcompact electric vehicle matched with a high performance racing vehicle). The routine 200 returns the selected sound and returns to block 202 to repeat the sound simulation routine 200.

Returning to decision block 208, if the vehicle velocity is determined to not correspond to a stationary vehicle state, hence a non-stationary vehicle state, at block 212, the vehicle sound simulation system 102 selects a non-stationary sound. An example of a sub-routine for selecting a non-stationary sound will be described with regard to FIG. 3. Additional or alternative methodologies may also be applied. Once a non-stationary sound is selection, the routine 200 returns the selected sound and returns to block 202 to repeat the sound simulation routine 200. Illustratively, the routine 200 continues to repeat as long as the vehicle sound simulation system 102 remains active.

Figure 3:
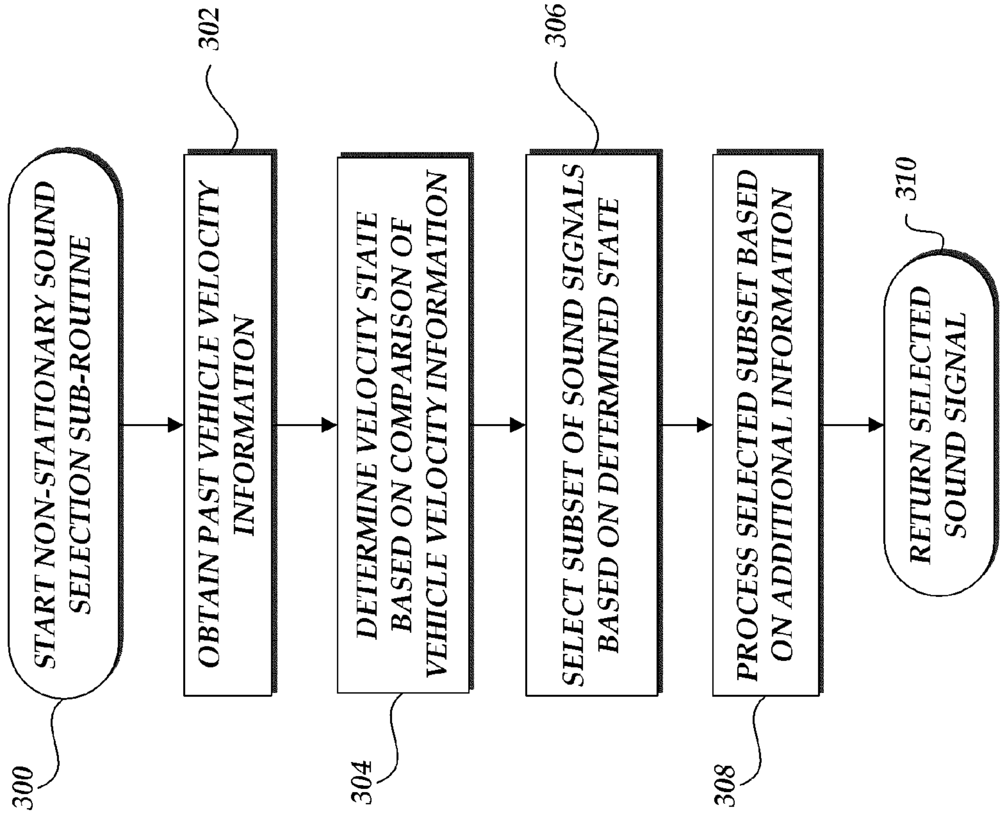
FIG. 3 is a flow diagram illustrative of a non-stationary sound selection sub-routine implemented by a vehicle sound simulation system.

Turning now to FIG. 3, a sub-routine 300 implemented by the vehicle sound simulation system 102 to select a non-stationary sound will be described. At block 302, the vehicle sound simulation system 102 obtains past vehicle velocity information. Illustrative, the vehicle sound simulation system 102 can maintain at least some portion of previously calculated vehicle state information, such a history of several seconds of vehicle velocity information. This history may be stored in system memory 105 or via temporary memory storage associated with the processing component 104. At block 304, the vehicle sound simulation system 102 determines vehicle acceleration or deceleration state based on a comparison of current vehicle velocity information and past vehicle velocity information. In an illustrative embodiment, the vehicle acceleration state can be characterized into a number of categories of vehicle velocity state, including a steady state corresponding indicative of no, or minimal velocity change, a slow acceleration state indicative of an increase in velocity less than an acceleration increase threshold, a fast acceleration state indicative of an increase in velocity greater than the acceleration increase threshold, a slow deceleration state indicative of a decrease in velocity below a deceleration decrease threshold, and a rapid deceleration state indicative of a decrease in velocity above the deceleration decrease threshold. The acceleration increase threshold and deceleration decrease threshold can be defined in terms of change in velocity (e.g., more than 5 miles per hour) or a percentage increase/decrease (e.g., a decrease of more than 1.5%). The acceleration increase threshold and deceleration decrease threshold can be equal or separately defined. Moreover, in alternative embodiments, the vehicle sound simulation system 102 can include any number of categories of vehicle velocity state defined by one or more thresholds or other criteria.

At block 306, the vehicle sound simulation system 102 selects at least a subset of target sounds based on the determined vehicle velocity state. In an illustrative embodiment, the vehicle sound simulation system 102 can select a subset of sounds that corresponds exclusive to each determined vehicle velocity state. Alternatively, the vehicle sound simulation system 102 can first determine whether specific sounds that correspond to specific vehicle velocity states are applicable. If not, the vehicle sound simulation system 102 can conduct further processing as explained below. For example, if the vehicle is determined to be in a steady state vehicle velocity state, the vehicle sound simulation system 102 may generate a specific sound that only corresponds to that state or simply repeat the sound previously generated by the vehicle sound simulation system 102. Alternatively, if the vehicle is determined be in a slow deceleration state, the vehicle sound simulation system 102 may narrow the sounds to a subset of sounds that may be appropriate, but will have to conduct additional processing in order to select a specific sound signals.

One skilled in the relevant art will appreciate that sound information utilized by the vehicle sound simulation system 102 can include data arrays in which each cell in the array constitutes a record containing data elements or fields. Engine state information such as velocity, throttle position and/or acceleration may be used as indices to access the appropriate record in the array that contains values on how to process that specific engine state. An example of such values would be values that are pointers indicating the beginning of sound signal information and the end of the sound signal information. Another example of such values would be a data field that acts as a Boolean flag indicating whether the sound clip should be looped or played only once. The sound signals may be exclusive to a particular vehicle velocity state. Alternatively, a specific sound signal may correspond to multiple vehicle velocity states.

At block 308, the vehicle sound simulation system 102 processes the selected subset based additional information. The type of additional information utilized by the vehicle sound simulation system 102 can vary according to the determine vehicle velocity state or based on other vehicle state information. In one aspect, the vehicle sound simulation system 102 can determine whether the vehicle has crossed a velocity traditionally associated with a gear shift in vehicle. If so, the vehicle sound simulation system 102 can select a sound indicative of an “up shifting” transmission or a “down shifting” transmission. In another aspect, the vehicle sound simulation system 102 can determine whether a target sound has been previously generated within a time window. If so, the vehicle sound simulation system 102 may select another target sound or keep a count of the number of times the sound has been repeated (assuming that the vehicle sound simulation system 102 incorporates a repetition threshold). In a further aspect, the vehicle sound simulation system 102 can select from the subset of sounds based on a random number selection. For example, the subset of sounds may be indexed according to a distribution of potential sounds. The distribution may be equal to statistically promote random sound generation or unequally to favor the generation of specific sounds. The indexing of the sounds may be dynamically applied such that the vehicle sound simulation system 102 can control the distribution of sounds. In still another aspect, the vehicle sound simulation system 102 can obtain other information, such as information from a vehicle proximity sensor indicative of physical objects nearby to the vehicle. If such information may be present, the vehicle sound simulation system 102 may select different sounds to generate more of an external alert.

One skilled in the relevant art will appreciate that block 308 may be omitted if only a single sound is available or additional processing is not otherwise necessary. Additionally, as similarly described with regard to block 210 (FIG. 2), the additional processing in block 308 may be utilized to determine volume levels or other parameters of a selected sounds. Finally, the above-described different aspects of additional processing may be utilized in various combinations or individually. The order and selection of the additional processing techniques may be customizable by the vehicle sound simulation system 102 manufacturer, distributor user. Still further, in another embodiment, routine 300 may be utilized to generate multiple sounds to different external playback devices 118. For example, a first sound may be selected to be generated for the benefit of a driver of the vehicle, while a different sound may be selected to be generated for the benefit of pedestrians nearby the vehicle.

At block 310, the selected sound(s) are returned and the sub-routine 300 terminates.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, “can,” “could,” “might,” or “may,” unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally intended to convey utilization of the conjunction “or” in enumerating a list of elements does not limit the selection of only a single element and can include the combination of two or more elements.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as Secure Digital Card (SD Card) storage, a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A vehicle sound simulation system comprising:

a vehicle input interface component for obtaining vehicle operation information generated by a vehicle in operation, the vehicle operation information including a measure of vehicle velocity information and vehicle throttle position information;

a processing component, executed on a processing component, the processing component for:

determining whether a vehicle velocity state corresponds to a stationary state based on a determination whether the vehicle operation information exceeds a velocity threshold;

if so, selecting sound signals based on the vehicle throttle position information;

determining whether a vehicle velocity state corresponds to a non-stationary state; and if so, determining an applicable category of vehicle velocity state, wherein the applicable category of vehicle velocity state corresponds to one or more predefined states;

selecting a sound signal based on a category of vehicle velocity state; and an external interface component for causing the generation of selected sound signals.

2. The vehicle sound simulation system as recited in claim 1, wherein vehicle interface component corresponds to a vehicle diagnostics standard.

3. The vehicle sound simulation system as recited in claim 2, wherein the vehicle diagnostics standards include the OBD-II vehicle diagnostics standard.

4. The vehicle sound simulation system as recited in claim 1, wherein the category of vehicle velocity state information corresponds to at least one of a steady state vehicle velocity state, an acceleration vehicle velocity state, or a deceleration vehicle velocity state.

5. The vehicle sound simulation system as recited in claim 4, wherein the acceleration vehicle velocity state corresponds to at least one of a slow acceleration vehicle velocity state or a rapid acceleration vehicle velocity state.

6. The vehicle sound simulation system as recited in claim 4, wherein the deceleration vehicle velocity state corresponds to at least one of a slow deceleration vehicle velocity state or a rapid deceleration vehicle velocity state.

7. The vehicle velocity state as recited in claim 1, wherein the processing component utilizes a vehicle velocity state threshold to determine the vehicle velocity state category.

8. The vehicle sound simulation system as recited in claim 7, wherein the vehicle velocity state threshold corresponds to an absolute change in velocity.

9. The vehicle sound simulation system as recited in claim 7, wherein the vehicle velocity state threshold corresponds to a percentage change in velocity.

10. The vehicle sound simulation system as recited in claim 1, wherein the processing component utilizes additional information in selecting a sound signal based on a category of vehicle velocity state.

11. The vehicle sound simulation system as recited in claim 10, wherein the processing component utilizes a gear shift velocity to select a sound.

12. The vehicle sound simulation system as recited in claim 10, wherein the processing component utilizes a random number to select from indexed sounds.

13. A method for vehicle sound simulation comprising:

obtaining vehicle state information generated by a vehicle in operation, the vehicle state information including at least one of vehicle velocity information and vehicle throttle position information;

determining whether a vehicle velocity state corresponds to a stationary state based on a determination whether the vehicle operation information exceeds a velocity threshold;

selecting a first sound signal based on the vehicle throttle position if the vehicle velocity state corresponds to a stationary state;

determining whether a vehicle velocity state corresponds to a non-stationary state; and selecting a second sound signal based on a category of vehicle velocity state if the vehicle velocity state corresponds to a non-stationary state, wherein the category of vehicle velocity state corresponds to one or more predefined states; and causing the generation of a selected sound signal.

14. The method as recited in claim 13, wherein the acceleration vehicle velocity state corresponds to at least one of a slow acceleration vehicle velocity state or a rapid acceleration vehicle velocity state.

15. The method as recited in claim 13 further comprising processing the vehicle velocity state category information with additional information to select the sound signal.

16. The method as recited in claim 15, wherein processing the vehicle velocity state category information with additional information includes utilizing a random number to select sound signals indexed according to a range of numbers.

17. The method as recited in claim 15, wherein processing the vehicle velocity state category information with additional information includes determining whether a target sound has been previously generated.

18. The method as recited in claim 13, wherein causing the generation of a selected sound signal includes causing the generation of a plurality of sound signals.

* * * * *